United States Patent [19]

Watanabe et al.

[11] 4,233,072

[45] Nov. 11, 1980

[54] SLIDING MEMBER HAVING WEAR- AND SCUFF-RESISTANT COATING ON ITS SURFACE

[75] Inventors: Tamotu Watanabe, Kashiwazaki; Tatsuei Sakata, Nishiyama; Yoshikuni Mizuma, Kashiwazaki, all of Japan

[73] Assignee: Riken Corporation, Tokyo, Japan

[21] Appl. No.: 915,592

[22] Filed: Jun. 15, 1978

[30] Foreign Application Priority Data

Jul. 28, 1977 [JP] Japan .................................. 52-89762

[51] Int. Cl.³ .............................................. B22F 5/00
[52] U.S. Cl. ................................. 75/236; 277/235 A; 428/564
[58] Field of Search .................... 75/236; 428/564; 277/235 A

[56] References Cited

U.S. PATENT DOCUMENTS

| | | | |
|---|---|---|---|
| 3,539,192 | 11/1970 | Prasse | 277/235 A |
| 3,556,747 | 1/1971 | Hyde et al. | 428/564 |
| 3,690,686 | 9/1972 | Prasse et al. | 277/235 A |
| 3,814,447 | 6/1974 | Prasse et al. | 75/236 |
| 3,938,814 | 2/1976 | Cromwell | 428/564 |

*Primary Examiner*—Brooks H. Hunt

[57] ABSTRACT

A sliding member having a coating especially suitable for a piston ring or a cylinder liner in which excellent wear- and scuff-resistance, as well as excellent initial wear-in property are required. The coating is produced by plasma-arc flame spraying a mixed powder comprising molybdenum powder, nickel-chromium alloy powder and titanium carbide powder on a base surface of the sliding member made of iron or steel.

3 Claims, 8 Drawing Figures

FIG. 2
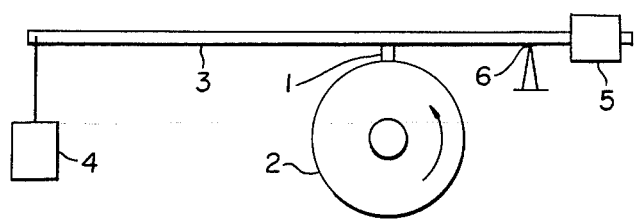
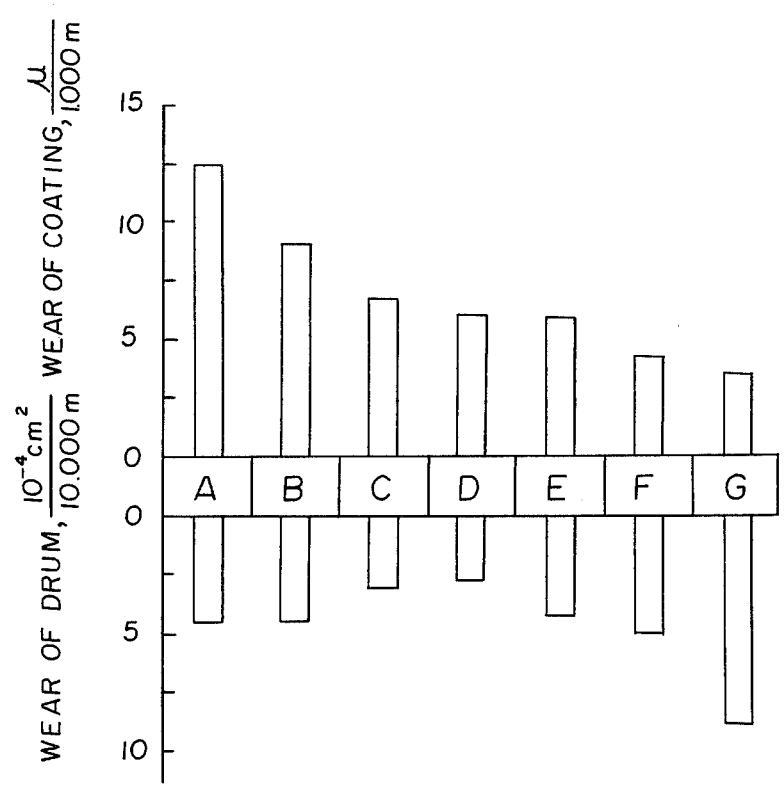
FIG. 1

SLIDING MEMBER HAVING WEAR- AND SCUFF-RESISTANT COATING ON ITS SURFACE

FIELD OF THE INVENTION

The present invention relates to a sliding member having an improved sliding surface quality and being especially suitable for a piston ring or a cylinder liner.

The sliding member, for example, such as piston ring or cylinder liner for an internal combustion engine operating under severe condition of high speed and heavy load, generally causes heavy wear in an early stage of time or often causes scuffing. Such troubles reduce the powers of engine, and shorten the life-time thereof and, in addition, may be connected with a danger of causing accident. So that, many studies have been done to improve the wear resistance of the sliding member.

DESCRIPTION OF THE PRIOR ART

Conventionally, the chromium plated piston rings have been used in the internal combustion engines and have exhibited good wear resistance, but the chromium plated surface is susceptible to scuffing. So that, instead of the chromium plated piston ring, a molybdenum coated piston ring such as shown in Anderson U.S. Pat. No. 2,905,512 has been put into practical use. Molybdenum-sprayed coating has an oil retaining property and shows excellent scuff resistance, but exhibits inferior wear resistance to that of the chromium plated layer.

Thereafter, many studies have been made to improve the above-mentioned defect of the molybdenum coated layer.

For example, a piston ring having a plasma spray-coated layer comprising maximum 23.75% by weight (hereinafter percent represents weight percent) of nickel-chromium alloy, 37.5 to 95% of chromium carbide and 5 to 50% of molybdenum such as shown in Hyde et al. U.S. Pat. No. 3,556,747 is provided. This plasma-spray-coated layer contains large quantity of chromium carbide, so that it exhibits very little wear when runs under sliding frictional condition, but increases wear of a mating sliding surface, additionally, its scuff resistance is unsatisfactory, because of its low molybdenum content.

A piston ring having a plasma spray-coated layer consisting of 26% of tungsten-cobalt alloy phase, 45% of molybdenum phase and 29% of nickel-chromium alloy phase such as shown in Prasse et al. U.S. Pat. No. 3,814,447 and a piston ring having a plasma spray-coated layer consisting of 15 to 40% of nickel-chromium base self-fluxing alloy, 5 to 30% of 75% cobalt-25% molybdenum alloy and 30 to 60% of molybdenum such as shown in Cromwell U.S. Pat. No. 3,938,814 are also provided. But in either patents, the molybdenum content is low, so that their scuff resistance and wear resistance are not satisfactory.

A piston ring with a plasma spray-coated layer consisting of 65 to 90% of molybdenum, 7 to 25% of nickel, 1 to 6% of chromium, 0.3 to 1.5% of boron and 0.2 to 1.5% of silicon, and having a microstructure in which a secondary phase of Vickers hardness from 950 to 1200 exists in a phase of Vickers hardness from 900 to 1000 such as shown in Prasse U.S. Pat. No. 3,690,686 is also proposed. This plasma spray-coated layer shows considerable progress in respect of increasing the strength of a coated layer, but does not come to show sufficient wear resistance, because the hardness of a secondary phase is not sufficiently high.

SUMMARY OF THE INVENTION

Accordingly, it is an object of the present invention to provide an improved sliding member having excellent wear- and scuff-resistant coating on its sliding surface to dissolve the above-mentioned problems.

The sliding member having the wear- and scuff-resistant coating may be obtained by applying a mixture comprising 60 to 85% of molybdenum powder, 10 to 30% of nickel-chromium alloy powder and 5 to 20% of titanium carbide powder on the surface of the sliding member made of iron or steel.

The coating relating to the present invention may be obtained by plasma-arc spraying as is well known in the art. The plasma-arc spraying is suitable for obtaining a coating with high cohesive strength, because the plasma flame of extremely high temperature can melt wear resistant powders having high melting temperature very easily.

BRIEF DESCRIPTION OF THE DRAWINGS

FIG. 1 is a graph showing one of the wear test results.

FIG. 2 is a schematic illustration of a wear test apparatus.

DETAILED DESCRIPTION OF THE INVENTION

Figure 4:
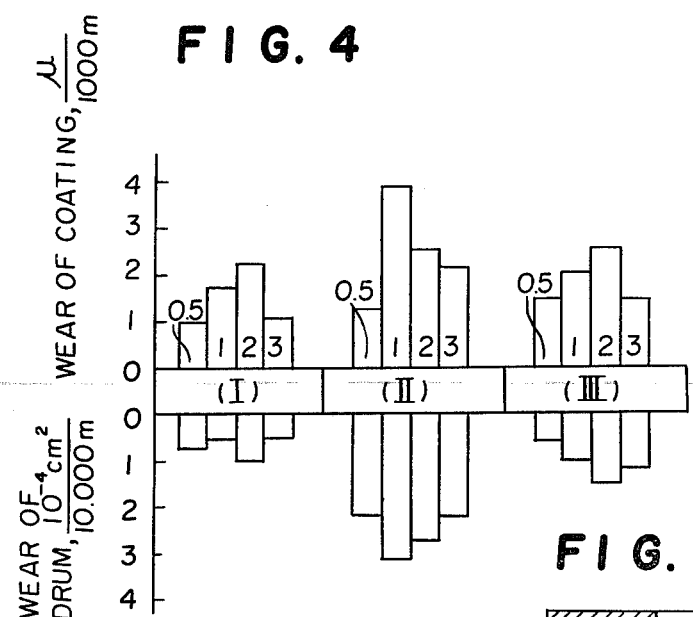
FIG. 4 is a graph showing one of the results of the wear test of the coatings relating to the present invention and of comparative coatings.

As mentioned above, the wear- and scuff-resistant coating of the present invention may be obtained by plasma-arc spraying a physical mixture comprising molybdenum powder, nickel-chromium alloy powder and titanium carbide powder on to a surface of a sliding member.

When molybdenum powder content is less than 60% in the mixture, the scuff resistant property of the coating deteriorates, and when molybdenum powder content is more than 85% in the mixture, portion having relatively low hardness such as micro Vickers hardness ranging from 500 to 600 increases, because molybdenum is hardly oxidized by plasma-arc spraying, as a result the wear resistance of the coating deteriorates suddenly. Therefore, the preferable content of molybdenum powder in the mixture is 65 to 85%.

Nickel-chromium alloy powder is used for increasing the strength of the coating. When nickel powder and chromium powder are added individually in the mixture, increase in the strength of the coating is not obtainable, additionally, as the result of increasing oxidation of chromium, the wear resistance of the coating deteriorates largely.

Accordingly, pre-alloyed nickel-chromium alloy powder should be used. The inventors have found that when the ratio of nickel to chromium in nickel-chromium alloy is about 4:1, maximum strength of the coating is attained and the wear resistance is improved remarkably. Therefore, it is preferable in the present invention to use the nickel-chromium alloy powder having the ratio of nickel to chromium in about 4:1 to insure the strength and the wear resistance of the coating, but the ratio is not always restricted to this value.

When the quantity of the nickel-chromium alloy powder in the mixture is less than 10%, the increase in coating strength is comparatively small, and the strength of the coating increases with the increase of mixing quantity of the nickel-chromium alloy powder. But when the nickel-chromium alloy phase in the coating becomes too much, the wear resistance and the scuff resistance decrease. Therefore, the preferable quantity of nickel-chromium alloy powder in the mixture is about 10 to 30%.

Titanium carbide is added to improve the wear resistance of the coating. When the quantity of titanium carbide in the mixture is less than 5%, the effect is small. The wear resistance of the coating increases according to the increase of mixing quantity of titanium carbide. But when that quantity is over 20%, the mating sliding surface becomes to wear largely. Therefore, the preferable quantity of titanium carbide in the mixture is about 5 to 20%.

FIG. 1 shows one of the results of the wear test of the combination of coatings and cast iron to be used for cylinder. By this wear test, the mixing ratio of molybdenum powder and titanium carbide powder in the mixture to be sprayed is changed while the quantity of nickel-chromium alloy powder is maintained at 10% or 15%.

The wear test apparatus is shown schematically in FIGS. 2, wherein, 1 is a test piece of 5×5 mm in cross-section and 20 mm height, 2 is a rotary cylindrical drum of 135 mm diameter and 240 mm length having surface roughness of 1.5 to 2.0 microns and being made of cast iron FC 25 defined by JIS G5501, correspond to ASTM designation A48-64 No. 35B, 3 is a lever, 4 is a weight, 5 is a balancer and 6 is a fulcrum.

The test conditions are as follows;
friction speed: 0.5, 1, 2 and 3 m/sec.,
contact pressure: 10 kg/cm$^2$,
friction distance: 10,000 m.

Seven kinds of the mixture A to G in Table 1 are applied to the sliding surface of the test pieces by plasma-arc spraying. The sliding surfaces are sprayed until a coating thickness of 0.3 mm is attained and then finished evenly by grinding.

TABLE 1

| Kind of powder | (wt. percent) | | | | | | |
|---|---|---|---|---|---|---|---|
| | A | B | C | D | E | F | G |
| Molybdenum | 90 | 85 | 80 | 75 | 65 | 55 | 45 |
| Titanium carbide | 0 | 0 | 5 | 10 | 20 | 30 | 40 |
| Nickel-chromium alloy | 10 | 15 | 15 | 15 | 15 | 15 | 15 |

The conditions of spraying are as follows:

spray gun: Metco plasma-arc gun 3MB
electric current: 450–500 Amp.
carrier gas: argon, 110 ft$^3$/hr,
hydrogen, 15 ft$^3$/hr.

In FIG. 1, the amount of wear of the test pieces is shown as a total amount of wear at each friction speed, and the amount of wear of the drum is shown by area of ditch shaped wear trace appeared in longitudinal section including the center axis of the drum.

FIG. 1 shows that the amount of wear of the coating decreases according to the increase of the mixing quantity of titanium carbide powder, but wear of the mating surface is smallest in case of the mixture comprising 75% of molybdenum powder, 10% of titanium carbide powder and 15% of nickel-chromium alloy powder. And according to the decrease of the mixing quantity of molybdenum powder with the increase of the mixing quantity of titanium carbide powder, the wear of the coating decreases gradually, but the wear of the mating surface rather increases.

For wear resistant property of a sliding member, it is required that not only the wear of itself but also the wear of the mating surface is small.

From the above-mentioned example, under consideration of the wear amount of the mating surface, the coating obtained by plasma-arc spraying the mixture comprising 75% of molybdenum powder, 10% of titanium carbide powder and 15% of nickel-chromium alloy powder may be most preferable for the surface of the sliding member when it is used in combination with a cylinder made of cast iron FC25.

The reason why the coating of the sliding member of the present invention has the excellent wear resistant property is considered as follows.

This coating is suitable for the sliding surface, owing to its adequate pores for good oil retaining property and to a favorable hardness distribution in which high hardness phase and low hardness phase are mixed pertinently. This favorable hardness distribution is due to the combined structure of the coating formed by hard molybdenum, more hard titanium carbide, both increasing wear resistance, and nickel-chromium alloy bonding sprayed particles.

Especially, titanium carbide has the highest hardness (micro vickers hardness 3,200) among the constituents of the mixture used to obtain the coating of the present invention. As sliding is repeated, the wearing of the molybdenum phase and the nickel-chromium alloy phase in the coating proceeds selectively and the titanium carbide phase becomes a frame forming an oil basin.

Molybdenum improves an initial "wear in" property of the coating, and has an excellent effect to prevent scuffing due to break-down of oil film between the sliding surfaces during initial running period.

Figure 3:
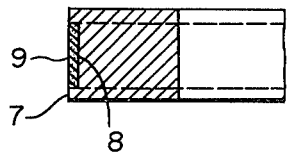
FIG. 3 is a fragmentary cross-sectional view of an embodiment of the present invention, in an enlarged scale.

For example, in case of the piston ring, such as shown in FIG. 3, the coating 7 is formed by plasma-arc spraying the mixture in a belt-shaped ditch 8 shaved on an outside surface of the piston ring, and in case of a cylinder or a cylinder liner, the coating is formed by plasma-arc spraying with a plasma-arc spray gun for inside surface spraying on the bore surface, and then the surface of the coating is finished to the predetermined size by grinding.

The mixture is a physical mixture of powders or particles. The grain size of the powders is preferably under 150 mesh. It is well-known that the coating obtained by plasma-arc spraying has good oil retaining property based on its surface pores, and so that the coating can prevent wear and scuffing effectively by keeping the oil film between the sliding surfaces during operation.

But if pore size is too large or porosity is too high, the strength of the coating decreases and fine fragments fall off from the coating, and wearing is accelerated.

Additionally, if porosity is too high, dust and/or hard combustion products existing on the sliding surfaces go into the pores and are retained there, that results in wearing the mating surface rapidly.

As the result, for example, the life of the engine or the operation time until overhauling is shortened.

By the above-mentioned reasons, the suitable grain size of the mixture used for the present invention should be under 150 mesh. But it is preferable that the fine particles under 5 microns are to be held as few as possible because such fine particles are scattered during spraying.

DETAILED DESCRIPTION OF PREFERRED EMBODIMENT

(1) Wear test

Wear test was accomplished under the aforementioned conditions with the apparatus shown in FIG. 2.

Three kinds of test pieces were tested. They were made of cast iron FC30 defined in JIS G5501 (correspond to ASTM Designation: A48-64, No. 40B). Their base surfaces were cleaned by grinding or other suitable techniques before spraying.

The sliding surfaces of the test pieces were coated respectively as follows:

(I) by spraying the mixture comprising 75% of molybdenum powder 10% of titanium carbide powder and 15% of nickel-chromium (75%Ni-25%Cr) alloy powder by means of plasma-arc spraying, (II) by applying the molybdenum powder by oxygen-acetylene flame spraying, (III) by applying the mixture comprising 75% of molybdenum powder and 25% of nickel-chromium base self-fluxing alloy powder by plasma-arc spraying, and, then, were finished by grinding.

The mating cylindrical drums were made of cast iron FC25.

FIG. 4 is a bar graph showing the test results according to the order of friction speed at every same group of test pieces separately.

The wear amount of the coating layer of the test pieces and of the mating drum are shown in the same way as FIG. 1.

The wear of the test piece relating to the present invention (I) is smallest at each friction speed, showing about three-fifths or four-fifths of the wear of the test piece (II) or the test piece (III) respectively.

The wear of the mating drum is very small in case of the test piece (I) relating to the present invention in comparison with other case of the test piece (II) or (III).

It is understood that the test piece relating to the present invention (I) not only wears itself very little, but also abrades the mating surface very little, therefore has the excellent wear resistant property.

(2) Bench test

The piston rings having a size of 125×4.0×4.5 mm were made of ductile cast iron in shape such as shown in FIG. 3, and were coated with three kinds of mixtures same as in the case of the above-mentioned wear test. The coating was obtained by applying the mixture onto the belt-shaped ditch of 2.5 mm width and 0.25 mm depth shaved on an outside surface of the piston ring, and then, was finished by grinding.

The engine offered to the test was a six cylinder of 125 mm bore diameter, water cooled diesel engine and had cylinder liners made of cast iron FC 25.

The bench test was accomplished under the conditions of 2,000 r.p.m., full load, 100° C. of oil temperature, 80° C. of cooling water temperature and 200 hours of driving time.

Figure 5:
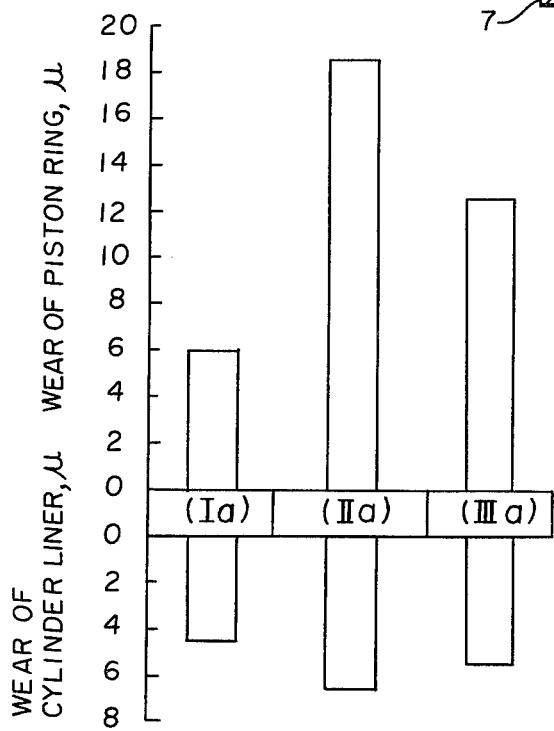
FIG. 5 is a graph showing one of the results of bench test with the piston rings having the coatings as shown in FIG. 3, relating to the present invention and comparative coatings.

The test results are shown in FIG. 5, in which (Ia), (IIa) and (IIIa) corresponding to the above-mentioned (I), (II) and (III).

In FIG. 5, the wear amounts of the outside surface of the piston ring are shown by a decrease of radial thickness, and the wear amounts of the bore surface of the cylinder liner are shown by a half of an increase in diameter near the top dead center.

As distinctly shown in FIG. 5, the wear of the piston ring related to the present invention (Ia) is the smallest among the tested piston rings and shows a value of one third to a half of the others. The wear amount of the mating cylinder liner is also the smallest.

Therefore, it is understood that the piston ring related to the present invention has an excellent wear resistant property.

(3) Scuffing test

Figure 6:
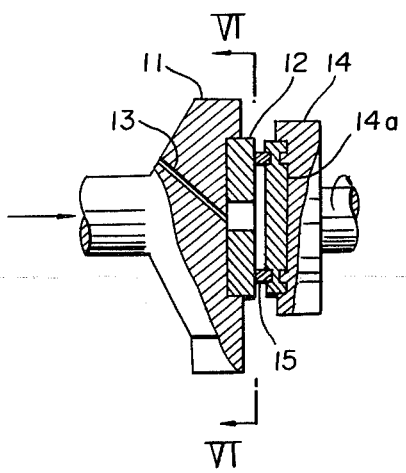
FIG. 6 is a partly sectioned schematic illustration of a scuff test apparatus.
Figure 7:
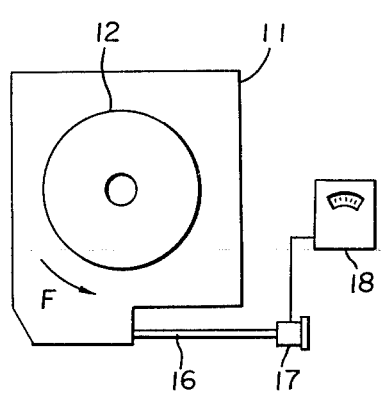
FIG. 7 is a side view along the arrow shown in FIG. 6.

The test apparatus is shown schematically in FIGS. 6 and 7. The lubricating oil is supplied through an oil hole 13 to a sliding surface of a disc 12 having a diameter of 80 mm which is set to a stater 11 removably. Pushing force is applied to the stater 11 from left to right in the figure with the prescribed pressure by an oil pressure pump being not illustrated in the figure. A rotor 14 is set opposite to the disc 12, and is rotated at a prescribed speed by a driving equipment which is not shown.

Four test pieces (5×5 mm in cross-section and 10 mm in height) 15 are fitted to a test piece holder 14a attached on the end face of the rotor 14. One end of each test piece is set removably in a hole in the surface of the holder 14a. While the rotor 14 is rotating, the other end of each test piece slides on the disc surface 12.

Under prescribed pressure the disc 12 being pushed to the test pieces 15, the rotor 14 is rotated while oil is supplied through the oil hole 13 to the sliding surface.

The pushing force is increased step by step at each stage of operation time, and the torque F being caused by friction between the test pieces 5 and the opposite surface of the disc 12 acts on the load cell 17 through the spindle 16. The change of the torque is measured by the dynamic strain meter 18 and is recorded.

It is considered that the scuffing occurs when the torque F increases suddenly and that the contact pressure of the test piece with the disc surface at that time is the scuffing pressure. The scuff resistant property is estimated by the scuffing pressure.

The test pieces were coated by plasma-arc spraying the three kinds of the mixture same as in the case of the above-mentioned wear test and then, were finished by grinding. They are shown in FIG. 8 as (Ib), (IIb) and (IIIb) corresponding to the above-mentioned (I), (II) and (III).

The test conditions are as follows;
friction speed: 8 m/sec.,
lubricant: motor oil SAE 30,
temperature of lubricating oil: 80° C.,
supplying rate of lubricating oil: 0.4 liter/min., contact pressure: increasing by 10 kg/cm² each every three minutes from 50 kg/cm²,
surface roughness: 2 microns.

Figure 8:
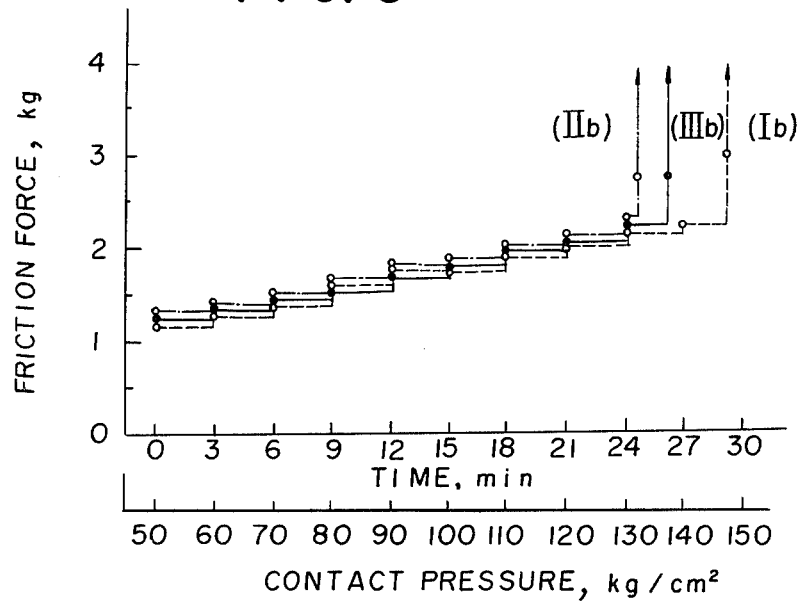
FIG. 8 is a graph showing the results of the scuff test.

The results of the tests are shown in FIG. 8. It is clearly noticed that the scuffing pressure of the test piece relating to the present invention (Ib) is maximum among the three test pieces.

It is easily understood that the coating obtained by the present invention has the highest anti-scuffing property among the three.

As mentioned above, the sliding member relating to the present invention has the better wear resistant property than the usual sliding members, and the wear of the mating surface is small, too. Additionally, it has the excellent scuff resistant property, therefore, it is suitable for the sliding member being exposed to severe operating conditions such as piston ring or cylinder liner of the internal combustion engine.

What is claimed is:

1. A sliding member having a wear resistant coating produced by plasma-arc spraying a mixture comprising 60 to 85% by weight of molybdenum powder, 10 to 30% by weight of nickel-chromium alloy powder and 5 to 20% by weight of titanium carbide powder on its sliding surface.

2. The sliding member of claim 1 wherein the ratio of nickel to chromium content of the nickel-chromium alloy powder is about 4:1 by weight.

3. The sliding member of claim 2 wherein said mixture comprising 75% by weight of molybdenum powder, 15% by weight of nickel-chromium alloy powder and 10% by weight of titanium carbide powder.

* * * * *